April 27, 1954   R. STRAUMANN   2,676,454
CLOCKWORK ESCAPEMENT
Filed Dec. 27, 1951
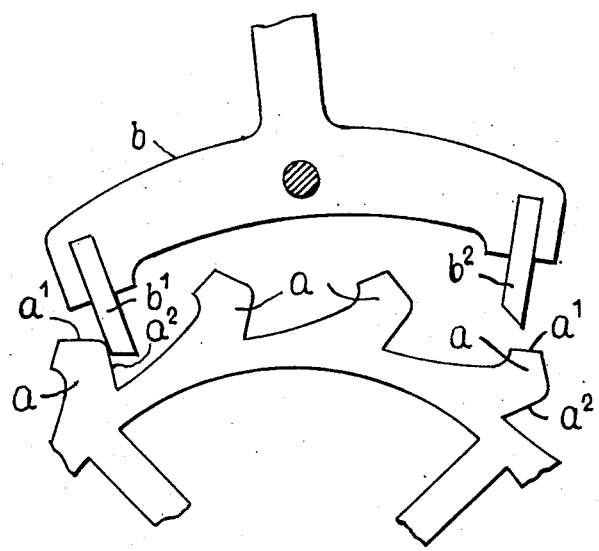
Inventor
Reinhard Straumann
By:
Henderoth, Lind & Ponack
Attorneys.

Patented Apr. 27, 1954

2,676,454

UNITED STATES PATENT OFFICE 2,676,454

CLOCKWORK ESCAPEMENT

Reinhard Straumann, Waldenburg, Switzerland

Application December 27, 1951, Serial No. 263,542

Claims priority, application Switzerland January 15, 1951

1 Claim. (Cl. 58—121)

In the known form of clockwork (which term includes watches) anchor or lever escapement the locking corner forming the junction between the impulse and locking faces of the scape wheel teeth which coacts with the anchor pallets, is a sharp corner. To reduce friction which gives rise to faulty operation, between this sharp corner and the working faces of the pallets, care must be taken to provide for adequate lubrication of these rubbing surfaces. On account of the said sharp corner of the scape wheel teeth however, lubrication only remains effective for a short time because these corners scrape the working faces of the pallets, rendering the lubrication of the rubbing surfaces so to say illusory.

The present invention is concerned with this lubrication problem and its purpose is to provide a better and effectively longer lasting lubrication of an anchor or lever escapement. To this end the working faces of the pallets coacting with the scape wheel teeth are provided with a strongly adherent extremely thin lubricating film, and these teeth are rounded off at the junction between the impulse and locking faces in order to save the lubricating film from being scraped off.

In the accompanying drawing, an example of part of an escapement according to the invention is shown.

In the scape wheel of anchor or lever escapements hitherto known, the locking corners at the junction between the impulse faces $a^1$ and the locking faces $a^2$ of the teeth $a$ are sharp corners, so that in operation they have a scraping action on the working faces of the pallets coacting with them. In contradistinction in the scape wheel of the anchor escapement according to the figure, these junctions are rounded off so that they do not scrape off the lubricant applied to the working faces of the pallets as in the case with sharp corner scape wheel teeth. It has been found however that the method of lubrication employed hitherto in which the rubbing surfaces are lubricated by drop-wise application of oil leaves something to be desired for the following reasons. The applied drops of oil are spread by the coaction of the teeth with the pallets $b^1$ and $b^2$ into a relatively thick layer of oil. When as time passes the oil thickens, the oil layer which has for the most part lost its lubricating qualities, forms a viscous and what is an impeding rather than a lubricating layer, over which the rubbing parts have to move. To overcome this disadvantage, in the escapement according to the figure, the lubrication is effected by the application of a minimal quantum of grease, oil or some other suitable lubricant on the working faces of the pallets $b^1$ and $b^2$, which quantum of lubricant is rubbed over these to form an extremely thin, strongly adherent lubricating film. It has been found that in this way lubricating films of a thickness of only a few molecular layers can be formed. With such a thin lubricating film even a thickening of the lubricant which may occur cannot have a disadvantageous effect because such thickening cannot here lead to the formation of a viscous impeding layer but there always remains a sufficiently smooth, strongly adherent lubrication film over which the scape wheel teeth can move all the more easily in so far as the corners are, as above mentioned, rounded off.

During a test in which an escapement with a scape wheel so formed and so lubricated ran for a year, no faults and no increase in friction occurred, as would have been expected with a usual escapement on one hand because of the above mentioned scraping action and on the other because the oil applied in a relatively thick layer in oil-lubricated escapements thickens in a comparatively short time. In an escapement according to the figure the slightest lubrication with grease or the like thus suffices, which corresponds to what may be called a dry-running escapement.

What is claim is:

In an anchor escapement having an escapement wheel provided with a plane impulse face, a plane locking face and corresponding working faces on corresponding pallets coacting with said plane impulse face and said plane locking face respectively, a continuous rounded edge between the plane impulse face and the plane locking face and a continuous extremely thin, strongly adherent lubricating film provided on said working faces of said pallets whereby the arrangement of said continuous rounded edge with the coacting faces of said pallets prevents the continuous lubricating film from being scraped off said locking face and said impulse face.

References Cited in the file of this patent

UNITED STATES PATENTS

| Number | Name | Date |
|---|---|---|
| 991,048 | Crank | May 2, 1911 |